July 15, 1924.

O. C. TRAVER

RELAY

Filed Sept. 12, 1923

Inventor:
Oliver C. Traver,
by Alexander S. ...
His Attorney.

Patented July 15, 1924.

1,501,733

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

RELAY.

Application filed September 12, 1923. Serial No. 662,162.

*To all whom it may concern:*

Be it known that I, OLIVER C. TRAVER, a citizen of the United States, residing at Schenectady, in the county of Schenectady, State of New York, have invented certain new and usful Improvements in Relays, of which the following is a specification.

My invention relates to improvements in relays operative in response to abnormal conditions on an electric circuit and more particularly to protective relays for controlling an electric circuit upon the occurrence of abnormal conditions hereon with a discriminating action dependent upon the voltage and the current of the circuit. An object of my invention is to provide an improved relay operative upon the occurrence of abnormal conditions on an electric circuit in response to the voltage and the current of the circuit selectively to control circuit controlling apparatus, indicating or signalling devices and the like with a discriminating time action dependent upon the degree and location of the fault producing the abnormal conditions. Another object of my invention is to provide a relay having independently movable and adjustable cooperating members arranged to be controlled respectively in accordance with the current and the voltage of an electric circuit so as to control relatively movable cooperating contacts with a discriminating time action dependent upon the voltage and current of the circuit.

My invention will be better understood from the following description taken in connection with the accompanying drawing and its scope will be pointed out in the appended claims.

Figure 1:
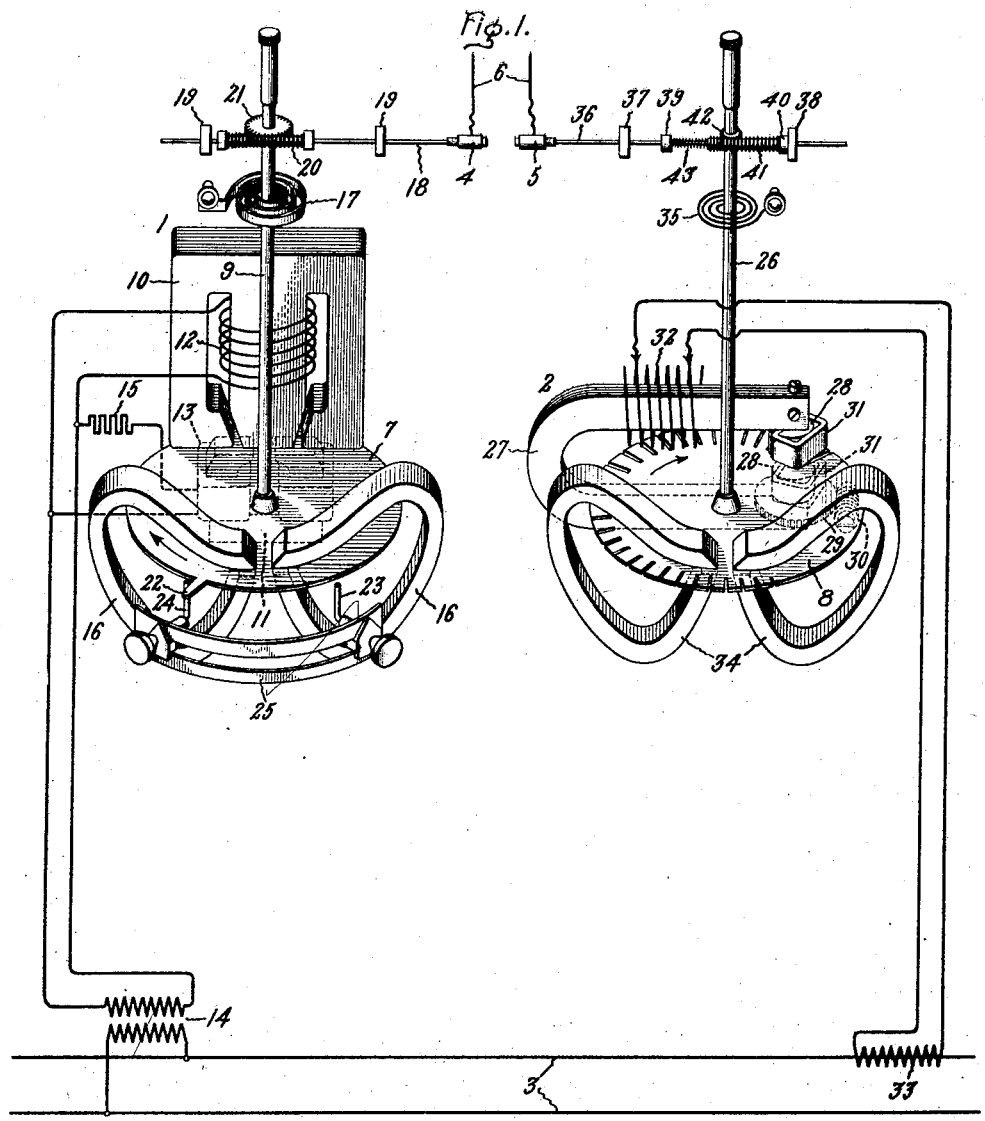
Figure 2:
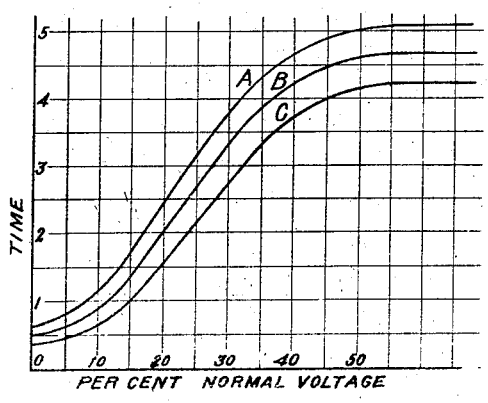

Fig. 1 illustrates in perspective a relay embodying my invention, and Fig. 2 is a diagram illustrating typical characteristic curves of the relay shown in Fig. 1.

The relay shown in Fig. 1 comprises two electroresponsive elements 1 and 2 respectively responsive to the voltage and the current of a line circuit 3 to control relatively movable cooperating contacts 4 and 5 in an auxiliary circuit 6 which may be arranged to control suitable circuit interrupting means in the circuit 3 or indicating or signalling devices in a manner well known to the art. Either or both of the electroresponsive elements 1 and 2 may be of the induction disk motor type as illustrated, although my invention is not limited in this respect but involves broadly the idea of two independently movable members such as 7 and 8 respectively responsive to the voltage and the current of an electric circuit to control for example the relatively movable cooperating contacts 4 and 5 with a discriminating time action.

The member 7, as shown, is a conducting member or disk, for example, of aluminum or copper secured to a suitably mounted rotatable member such as a shaft 9 and inductively associated with a torque producing or motor element comprising magnetic members 10 and 11. These members are adapted to be energized by windings 12 and 13 which are connected in parallel with each other and in shunt relation to the circuit 3 by suitable means such as a potential transformer 14. The currents flowing in the windings 12 and 13 therefore depend upon the voltage on the circuit 3 and are displaced in phase in accordance with the relative resistances and reactances of the windings. The phase relation may be further varied by the interposition of a resistance 15 in the circuit of one of the windings 13 for example. The shifting magnetic field produced by the interaction of the magnetic members 10 and 11 induces currents in the disk 7 and tends to cause the same to rotate in a well understood manner. The motor element comprising members 10 and 11 exerts on the disk 7 a torque dependent upon the voltage on the circuit 3 and tends to rotate the disk in the direction shown by the arrow. Damping magnets 16 may be provided to retard the movement of the disk 7 by imposing a load thereon directly proportional to the speed of the disk. The torque exerted on the disk 7 by the motor element is opposed by a suitable counter torque or force exerting means such as a spring 17 which is secured to the shaft 9 and to a fixed support such as the base frame or supporting structure for the elements 1 and 2. For clearness of illustration, this supporting structure is not shown. The spring 17 biases or tends to turn the disk 7 in a direction opposite to that shown by the arrow.

The contact 4 is insulated from and mounted on a carrying member such as a rod 18 which is slidably mounted in guides 19 of the supporting structure. Adjustably positioned on the rod 18 for movement therewith is a rack 20 which is in driving relationship with the shaft 9 through a gear 21 secured thereto. For varying the travel of the contact 4, the disk 7 may be provided with a projection 22 arranged to engage adjustably positioned stops 23 and 24 movable over a suitable supporting structure such as a plate 25. This plate may be suitably graduated so as to indicate the positions which the stops 23 and 24 should have for different voltage and time conditions.

With no voltage on the circuit 3, the spring 17 will move the disk 7 to a position determined by the stop 23 against which the projection 22 will bear and the contact 4 will be moved toward contact 5 of current element 2, but upon the energization of the circuit 3, the motor element associated with disk 7 will move the disk in the direction shown by the arrow against the bias of the spring 17 until equilibrium is established and if the voltage be above a predetermined value the disk 7 will be moved until the projection 22 bears against the stop 24. Contact 4 is therefore moved away from contact 5 and held in a position dependent upon the voltage, if below said predetermined value, or in a definite position depending upon the position of stop 24, if the voltage is above the predetermined value. Consequently, upon a decrease in voltage below the predetermined value, the contact 4 will be moved towards contact 5 an amount dependent upon the decrease in voltage, that is to say, the disk 7 will move in a direction opposite that shown by the arrow until equilibrium is established or until the projection 22 bears against stop 23.

The member 8, as shown, is a conducting member or disk, for example, of aluminum or copper secured to a suitably mounted rotatable member such as a shaft 26 and inductively associated with a torque producing or motor element which may be of the so-called shaded-pole type comprising a magnetic member 27, which may have adjustably positioned shaded poles 28 for varying the torque on the disk. For fine adjustments, one of the poles 28 may be provided with a micrometer adjusting means comprising a gear 29 and a screw 30 engaging therewith. The poles 28 are provided with short circuited windings 31. The magnetic member 27 is adapted to be energized by a winding 32 provided with adjustable taps for different current settings and connected in series relation with the circuit 3 by suitable means such as a current transformer 33. The current flowing in the winding 32 and the currents induced in the short circuited winding 31 therefore depend upon the current in the circuit 3 and are displaced in phase. The shifting magnetic field produced by these currents induces currents in the disk 8 and tends to cause the same to rotate in a well understood manner. The motor element comprising member 27 exerts on the disk 8 a torque dependent upon the current in the circuit 3 and tends to rotate the disk in the direction shown by the arrow at a speed dependent upon the current. Damping magnets 34 may be provided to retard the movement of the disk 8 by imposing a load thereon directly proportional to the speed of the disk. The disk 8 is biased for movement in a direction opposite that shown by the arrow by a suitable counter torque or force exerting means such as a spring 35 which is secured to the shaft 26 and to a fixed support. In order to compensate for the increasing counter torque of the spring 35 as the disk 8 is rotated in the direction shown by the arrow, the disk 8 may be provided with a series of graduated slots so that as the disk 8 is rotated in the direction shown by the arrow an increasing amount of the material of the disk is presented between the poles 28. Without these slots the amount of movement of the disk will depend upon the current in the winding 32 and whether the slots are used or not the speed of the disk will be dependent upon the current in the winding 32.

The contact 5 is insulated from and mounted on a carrying member such as a rod 36 which is slidably mounted in guides 37 and 38 of the supporting structure. Slidably mounted on the rod 36 between collars or stops 39 and 40 which are adjustably positioned on the rod is a rack 41 which is in driving relationship with the shaft 26 through a gear 42 secured thereto. Cushioning or resilient means such as a spring 43 is interposed between the collar 39 and the rack 41. The rack 41 is preferably mounted in this manner for movement relatively to the rod 36 rather than rigidly secured thereto as is the rack 20 to the rod 18 so that in the event of the disk 8 being moved further than is necessary to move contact 5 to engage contact 4, the over-travel of the disk 8 will be absorbed or taken up by the spring 43. The spring 43 tends to move the rack 41 against the collar 40 and the spring 35 tending to turn the disk 8 in a direction opposite that shown by the arrow holds the rack 41 against collar 40 and the collar 40 against the guide 38 which thus acts as a stop to limit the movement of the disk 8 in a direction opposite that shown by the arrow.

So long as the current in the circuit 3 is below a predetermined value, the disk 8 will be held by the spring 35 with the collar 40 against guide 38, but upon the occurrence of current above the predetermined value, the disk 8 will be moved in the direction shown by the arrow at a speed dependent upon the current and if the disk is not slotted an amount dependent upon the current. Consequently, the contact 5 is moved toward contact 4.

Relays embodying my invention are particularly adapted for the protection of electric circuits upon the occurrence of overcurrent conditions which are usually accompanied by a drop in voltage which is greatest at the fault and decreases as the source is approached. For continuity of service, it is desirable that only the faulty section of a line or network be interrupted until the fault is cleared. With over-current relays having graduated time settings, it is difficult especially on heavy over-current conditions to avoid interrupting sound sections of a line but with relays embodying my invention, a discriminating time action dependent both upon the voltage and the current accompanying the abnormal condition is insured so that only the faulty section of the line is cut out.

Although relays have heretofore been constructed to have a discriminating time action dependent upon the voltage and the current of a line circuit, all with which I am familiar, have had the current and voltage elements either so mechanically, electrically or magnetically related that there could be no independent action of the elements and consequently any change or adjustment in one of the elements produced a disturbing action on the other and the setting of the relay for given voltage and current conditions was a difficult problem because of the delicacy of balance or equilibrium condition that had to be established. With relays embodying my invention, this question of nicety of balance is eliminated, since the current and voltage elements 2 and 1 respectively and the movable members which they control are so independently related that any adjustment or setting for either voltage or current can be made independently of the other. Therefore the utility of this method of protection is greatly enhanced since the useful range of operation of the relay is increased.

The action of relays embodying my invention will be better understood from Fig. 2 which illustrates typical characteristic curves of the relay shown in Fig. 1. In Fig. 2 the coordinate axes are respectively time and per cent normal voltage. Curves A, B and C show time of relay operation against per cent normal voltage on a line circuit such as 3, for example, for current conditions representing respectively 5, 10 and 20 times normal load current on the circuit 3. From these curves, it will be obvious that the time for the contacts 4 and 5 to move to circuit controlling position is substantially directly proportional to the line voltage and inversely proportional to the line current so that the relay nearest the fault operates the quickest. Thus at a predetermined voltage which in the curves shown is approximately fifty per cent of line voltage spring 17 of the voltage responsive element 1 begins to predominate and moves the disk 7 in a direction opposite that shown by the arrow so that contact 4 is moved toward contact 5 an amount dependent upon the decrease in voltage and in the meantime with current above a predetermined value the disk 8 is moved at a speed dependent upon the current in the direction shown by the arrow so that contact 5 is moved toward contact 4. Moving stop 24 to the right tends to lower the right hand substantially flat portion of the curves A, B, C. while moving stop 23 to the left tends to raise the left hand substantially flat portion of the curves A, B, C. In this way, the effect of the voltage element upon the time of action of the relay may be varied.

For line circuit protection, the movement of contact 4 with zero voltage, that is line deenergized, is not sufficient to cause engagement of the contacts as this would result in each relay tripping the circuit breaker it controls and so opening the line at every point. In other cases, however, where my relay may be used to provide both under-voltage and over-current protection as for example the protection of motors, the movement of the disk 7 may be such that contact 4 has sufficient travel to engage contact 5 upon the occurrence of voltage below a predetermined value irrespective of the current condition obtaining at the same time and similarly the movement of the disk 8 may be such as to move the contact 5 to meet contact 4 even though there is not sufficient drop in voltage to result in movement of the disk 7.

While I have shown and described only one embodiment of my invention, I do not desire to be limited to the exact arrangement shown and described but seek to cover in the appended claims all those modifications that fall within the true spirit and scope of my invention.

What I claim as new and desire to secure by Letters Patent of the United States, is:

1. In combination with an electric circuit, a relay comprising relatively movable cooperating contacts, a movable member for controlling one of said contacts controlled by the current in said circuit arranged upon the occurrence of current above a predetermined value to move said contact at a speed dependent upon the current, and a second movable member for controlling another of said contacts controlled by the voltage on said circuit and biased for movement in one direction arranged to assume a position dependent upon the voltage whereby the time interval between the occurrence of current above a predetermined value and the engagement of said contacts is dependent upon the voltage and the current of said circuit.

2. In combination with a line circuit, a relay comprising relatively movable cooperating contacts, adapted to control the energization of an auxiliary circuit, independently movable members for respectively controlling the movement of said contacts to circuit controlling position, means responsive to the current in said line circuit for controlling the operation of one of said members whereby upon the occurrence of current above a predetermined value in said said line circuit one of said contacts is moved at a speed dependent upon the current, means for exerting a force on another of said members tending to move the member in one direction, and means responsive to the voltage on said line circuit tending to move said other member in the opposite direction, effective on voltage above a predetermined value to hold the member in a predetermined position and upon a decrease in voltage below said predetermined value to permit said member to be moved by said force exerting means an amount dependent upon the decrease in voltage whereby upon the occurrence of an over-current condition on said line circuit the time of movement of said contacts to circuit controlling position is decreased in accordance with the decrease in voltage accompanying the over-current condition.

3. A relay comprising relatively movable cooperating contacts, a current responsive element comprising a movable member adapted upon current above a predetermined value to move one of said contacts an amount dependent upon the current, and a voltage responsive element comprising a movable member for actuating another of said contacts adapted upon voltage above a predetermined value to hold said other contact in a predetermined position and upon a decrease in voltage below said predetermined value to move said other contact in a direction to approach the contact controlled by the current responsive element an amount dependent upon the decrease in voltage whereby the relay is adapted to respond upon the occurrence of an abnormal condition on an electric circuit to control the engagement of said contacts in a time dependent upon the current and the voltage of the circuit.

4. A protective relay comprising relatively movable cooperating contacts, independently rotatable members for respectively controlling the movement of said contacts, electro-responsive torque exerting means for rotating one of said members operative in response to current above a predetermined value to move one of said contacts at a speed dependent upon the current, electro-responsive torque exerting means operative in response to voltage above a predetermined value to rotate another of said members in a direction to move the contact controlled thereby away from the contact controlled by said one of said members, and counter torque means tending to move said other member in the opposite direction whereby the relay is adapted to respond to an over-current condition on an electric circuit to control the engagement of said contacts in a time substantially directly proportional to the voltage and inversely proportional to the current of the circuit.

5. A relay comprising relatively movable cooperating contacts adapted to control the energization of an auxiliary circuit, independently movable members for respectively controlling the movement of said contacts to circuit controlling position, current responsive means for controlling the operation of one of said members adapted upon current above a predetermined value to move one of said contacts an amount dependent upon the current, voltage responsive means for controlling the operation of another of said members adapted on voltage above a predetermined value to move another of said contacts in one direction to a predetermined position, and means opposing the effect of said voltage responsive means operative upon the occurrence of a decrease in voltage below said predetermined value to move said other contact in the opposite direction an amount proportional to the decrease in voltage whereby the relay is adapted to respond to an over-current condition in a line circuit to control the time of movement of said contacts to circuit controlling position in accordance with the decrease in voltage accompanying the over-current condition.

6. A relay comprising relatively movable cooperating contacts, a current responsive element for controlling the movement of one of said contacts comprising a movable member biased to an initial position and means associated therewith operative in response to current above a predetermined value to move the member against the bias thereof and thereby to move said contact at a speed dependent upon the current, a voltage responsive element for controlling the movement of another of said contacts comprising another movable member biased for movement in a direction to move said contact towards the contact controlled by said current responsive element and means associated with said other member operative in response to voltage above a predetermined value to move the member against the bias thereof in a direction to move the contact controlled thereby away from the contact controlled by said current responsive element.

7. A protective relay comprising relatively movable cooperating contacts, independently movable members for respectively controlling the movement of said contacts, means for biasing one of said members to an initial position, means associated with said member operative in response to current above a predetermined value to move the member against the bias thereof at a speed dependent upon the current, means for biasing another of said members for movement in a direction to move the contact controlled thereby away from the contact controlled by said one of said members, means associated with said other member operative in response to voltage above a predetermined value to move the contact controlled thereby in the opposite direction, and means for limiting the movement of said other member in each direction whereby the travel of the contact controlled thereby may be varied.

8. A relay comprising relatively movable cooperating contacts, current responsive means for controlling the movement of one of said contacts comprising a rotatable conducting member biased to an initial position and a motor element associated therewith operative in response to current above a predetermined value to rotate the member against the bias thereof and thereby to move said contact at a speed dependent upon the current, voltage responsive means for controlling the movement of another of said contacts comprising another rotatable conducting member biased for movement in a direction to move said contact towards the contact controlled by said current responsive means, and a motor element associated with said other rotatable member operative in response to voltage above a predetermined value to rotate the member against the bias thereof in a direction to move the contact controlled by said current responsive means.

9. A relay comprising relatively movable cooperating contacts, current responsive means for controlling the movement of one of said contacts comprising a rotatable conducting member biased to an initial position and a motor element inductively associated therewith operative in response to current above a predetermined value to rotate the member against the bias thereof and thereby to move said contact at a speed dependent upon the current, voltage responsive means for controlling the movement of another of said contacts comprising another rotatable conducting member biased for movement in a direction to move said contact towards the contact controlled by said current responsive means, a motor element inductively associated with said other rotatable member operative in response to voltage above a predetermined value to rotate the member against the bias thereof in a direction to move the contact controlled thereby away from the contact controlled by said current responsive means, and means whereby the relay may be adjusted to adapt the responsiveness thereof to different current and voltage conditions.

10. A protective relay comprising relatively movable cooperating contacts, independently rotatable conducting members for respectively controlling the movement of said contacts, means for biasing one of said members to an initial position, a motor element inductively associated with said member operative in response to current above a predetermined value to move the member against the bias thereof at a speed dependent upon the current, means for biasing another of said members for movement in a direction to move the contact controlled thereby away from the contact controlled by said one of said members, a motor element inductively associated with said other member operative in response to voltage above a predetermined value to move the contact controlled thereby in the opposite direction, and means for limiting the movement of said other member in each direction whereby the travel of the contact controlled thereby may be varied.

In witness whereof, I have hereunto set my hand this 11th day of September 1923.

OLIVER C. TRAVER.